United States Patent [19]

Wan

[11] Patent Number: 5,491,568

[45] Date of Patent: Feb. 13, 1996

[54] METHOD AND APPARATUS FOR CALIBRATING A DIGITAL COLOR REPRODUCTION APPARATUS

[75] Inventor: Shijie Wan, Rochester, N.Y.

[73] Assignee: Eastman Kodak Company, Rochester, N.Y.

[21] Appl. No.: 260,134

[22] Filed: Jun. 15, 1994

[51] Int. Cl.⁶ .................................. G03F 3/08; H04N 1/46
[52] U.S. Cl. ......................... 358/518; 358/504; 358/515
[58] Field of Search .................................. 358/500, 504, 358/515, 517, 518, 525, 505, 474, 520, 524, 527, 530

[56] References Cited

U.S. PATENT DOCUMENTS

4,959,711  9/1990  Hung et al. ............................... 358/80
5,107,332  4/1992  Chan ......................................... 358/80
5,339,176  8/1994  Smilansky et al. ..................... 358/518

Primary Examiner—Edward L. Coles, Sr.
Assistant Examiner—Allan A. Esposo
Attorney, Agent, or Firm—Thomas H. Close

[57] ABSTRACT

A digital color reproduction apparatus of the type having a scanner for scanning a color image to produce scanner color signals representing the color image, a digital image processor for processing the scanner color signals to produce printer color signals, and a printer responsive to the printer color signals for reproducing the color image is said to be "closed" when the original color image and the reproduced color image are on the same medium. For a closed color reproduction system, the color transform from scanner color signals to printer color signals can be implemented using the tri-linear interpolation based on a 3D calibration lookup table. The 3D calibration lookup table can be derived automatically by: a) determining the relationship between equal printer color signals and averaged scanner color signals; b) based on the determined relationship, generating a set of color patches on the printer that are uniformly distributed in scanner color signal space; c) scanning the color patches to generate a lookup table relating printer color signals to scanner color signals; and d) inverting the lookup table to generate the calibration lookup table.

5 Claims, 6 Drawing Sheets

FIG. 12

METHOD AND APPARATUS FOR CALIBRATING A DIGITAL COLOR REPRODUCTION APPARATUS

FIELD OF THE INVENTION

This invention relates to color calibration for digital color reproduction systems.

BACKGROUND OF THE INVENTION

A digital color reproduction system such as a color fax, or a digital color copier includes a scanner for scanning a color image to produce scanner color signals representing said color image, a digital image processor for processing the scanner color signals to produce printer color signals, and a printer for reproducing the color image.

A color reproduction system is said to be "closed" if the input images to the system and output images from the system are printed on the same media (paper or film) using the same dye set. One example of a closed color reproduction system is a combination of a film scanner which scans color negatives, and a film writer which writes on color negatives. Another example is a system consisting of a reflection scanner which scans thermal color prints, and a thermal color printer which produces duplicate thermal color prints.

In a color reproduction system, the goal is often to make the reproductions match the originals as nearly as possible. In order to do so, a transform is employed in the digital image processor which maps the scanner color signals, normally in RGB space, to the printer color signals, normally in CMY space so that the system faithfully reproduces the original images. Often the transform is implemented by employing a relatively sparse three dimensional lookup table and a process of three dimensional interpolation between values in the table. The process of deriving such a transform is called system color calibration. If the system is closed, the process is called closed system color calibration, which is a special case of system color calibration.

Figure 1:
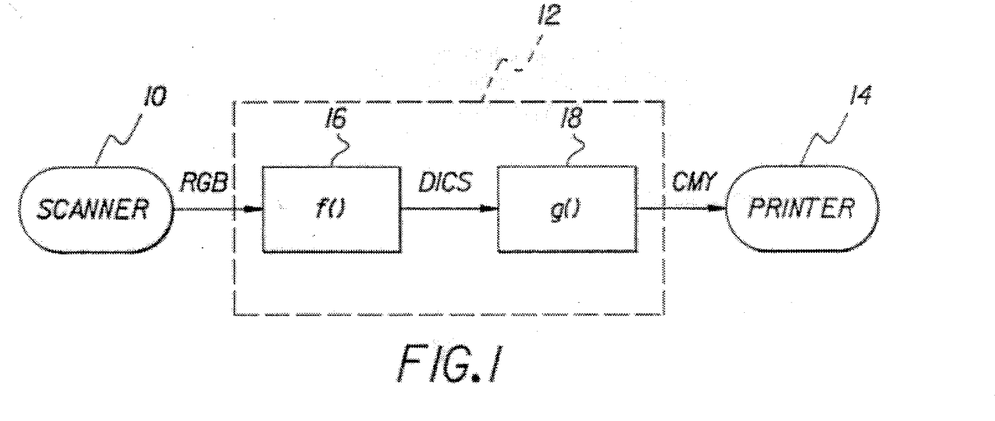
FIG. 1 is a schematic diagram illustrating a prior art color reproduction system.
Figure 2:
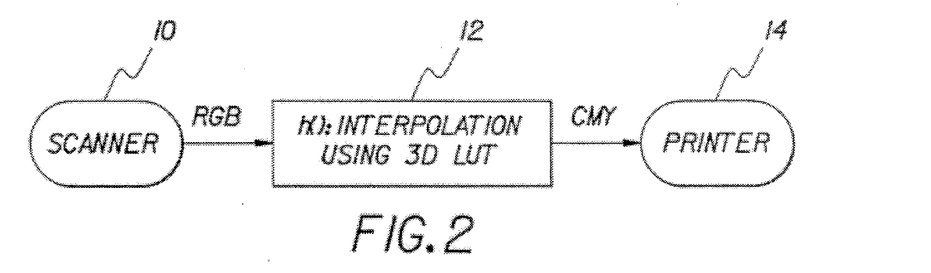
FIG. 2 is a schematic diagram illustrating the prior art color reproduction system with a single 3D lookup table.

FIG. 1 describes a conventional approach to digital color reproduction system calibration. A color scanner 10 produces scanner color signals RGB, which are processed by a digital image processor 12 into printer color signals CMY for printer 14. The calibration of the system is performed according to the prior art in two major steps. The first step is to derive a color transform f() 16 to convert the scanner color signals such as RGB into color signals in a device independent color space (DICS) such as CIEXYZ, L*a*b*, L*u*v*. The second step is to derive a transform g() 18 to convert color signals from the DICS to printer color signals CMY. The two transforms f() and g() may then be combined into one transform h() which converts scanner color signals into printer color signals directly. The transform h() is commonly implemented by employing a relatively small 3D LUT and a process of tri-linear interpolation between values in the lookup table as depicted in FIG. 2.

Calibrating a color reproduction system in this way involves: (i) generating a set of color patches on the printer; (ii) measuring the color patches using an optical instrument such as a spectroradiometer; (iii) using a mathematical method such as regression to derive the transform g() based on the measured data; (iv) scanning a set of test patterns; (v) measuring the test patterns using an optical instrument such as spectroradiometer; and (vi) employing a mathematical method such as regression to derive the transform f() based on the scanned data. Calibrating a system in such a way is non-trivial and it cannot be done automatically.

SUMMARY OF THE INVENTION

It is the object of the present invention to provide a simplified method to derive a 3D LUT to convert scanner color signals to printer color signals automatically for a closed color reproduction system. The object is achieved according to the present invention by: a) determining the relationship between equal printer color signals and averaged scanner color signals; b) based on the determined relationship, generating a set of color patches on the printer that are uniformly distributed in scanner color signal space; c) scanning the color patches to generate a lookup table relating printer color signals to scanner color signals; and d) inverting the lookup table to generate the calibration lookup table.

The advantages of the present invention for closed system color calibration are: (1) the color transform from scanner signal space to printer signal space are derived automatically without assistance of color experts; (2) it does not require additional optical instruments; (3) the color transform derived by this method can achieve high accuracy in color reproduction, compared with the conventional regression-based calibration approach; (4) finally, it automatically solves the field (daily) color calibration problem which exits virtually in every color reproduction system.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

As shown in FIG. 2, the goal for calibrating a closed color reproduction system is to derive a color transform h() which converts scanner color signals into printer color signals. This invention describes a method which can derive the color transform h() without the need of derivation of the transforms f() and g() as described above with respect to the prior art.

The basic approach of the present invention is to produce a number of carefully selected color patches (sample patches) from the output device, and then scan these color patches on the input device. In doing so, the correspondence of color signals between the input device and the output device is established among the sample color patches. A color transform h() is then derived based on the sample data. The present method consists of a number of steps which are described below.

Figure 10:
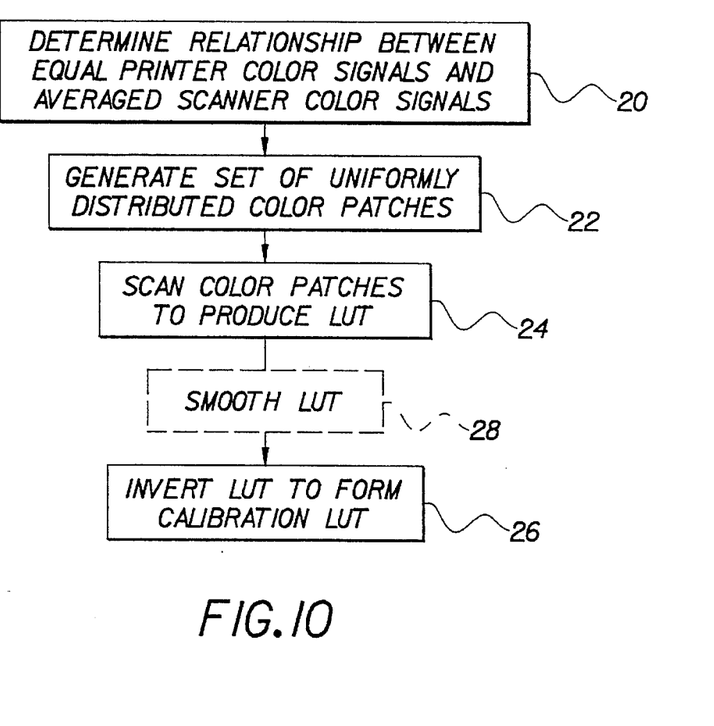
FIG. 10 is a flow chart illustrating the steps of calibrating a closed color image reproduction system according to the present invention

Referring to FIG. 10, the first step (20) in the method is to determine the relationship between equal printer color signals and averaged scanner color signals. Using the determined relationship, a set of color patches uniformly distributed in scanner color signal space are generated on the printer (22). These uniformly distributed color patches are then scanned on the scanner to produce a lookup table (24). Finally, the lookup table is inverted to produce the calibration lookup table (26). Optimally, as described in further detail below, the lookup table produced by scanning the uniformly distributed color patches may be smoothed (28) prior to the inversion step (26).

Figure 3:
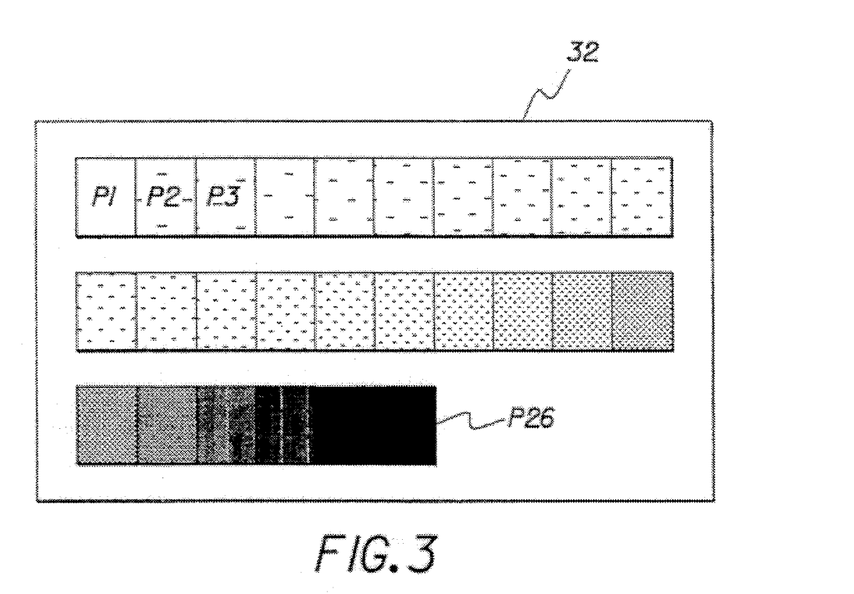
FIG. 3 is a is a schematic diagram showing a near-neutral test pattern employed in the method of the present invention.
Figure 4:
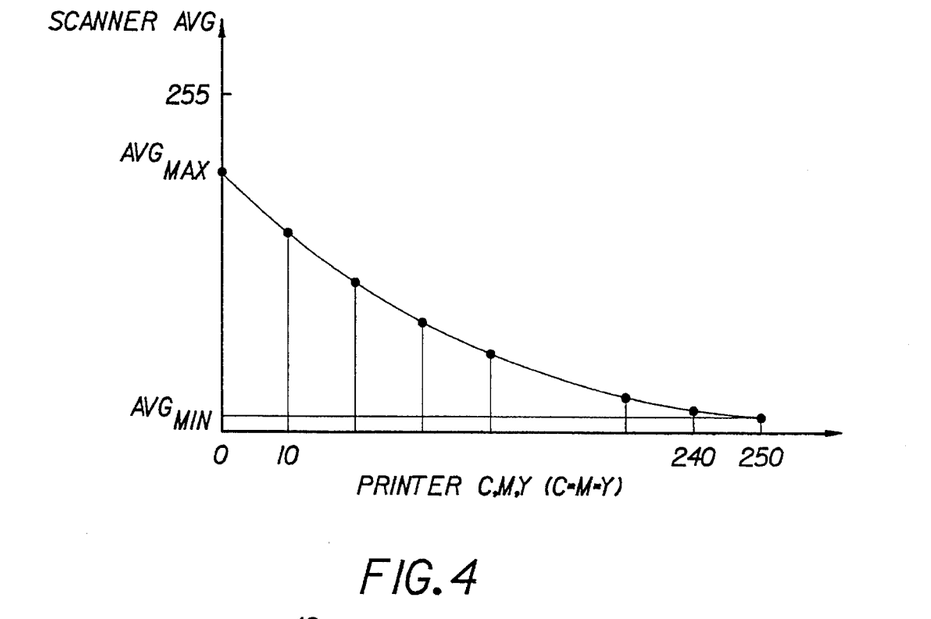
FIG. 4 is a is a graph describing the relationship between equal printer color signals and averaged scanner color signals.
Figure 11:
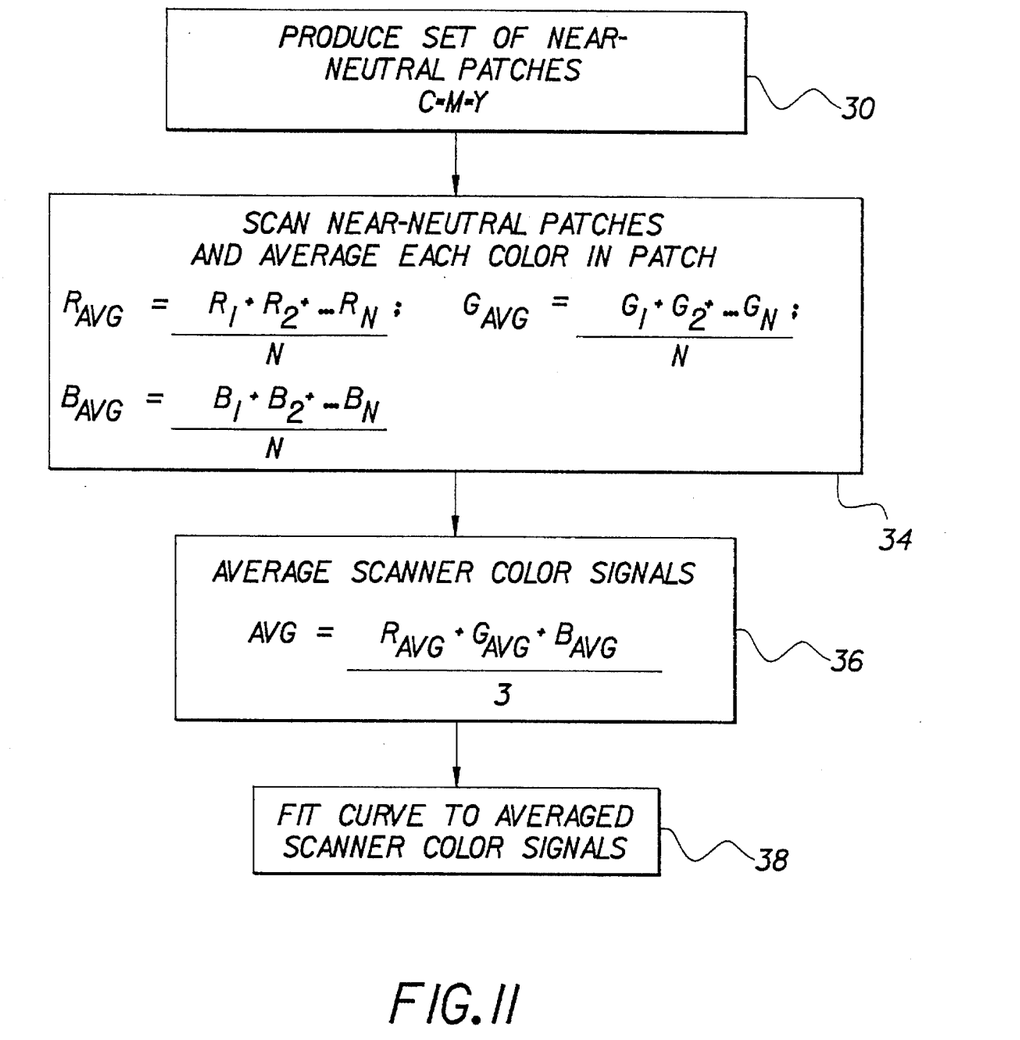
FIG. 11 is a flow chart illustrating the steps in determining the relationship between equal printer color signals and averaged scanner signals.

Referring to FIG. 11, the relationship between equal printer color signals and averaged scanner color signals is determined as follows. First, a set of near-neutral patches from the printer 14 are generated (30). Color signals in a digital input or output device are usually represented by 3 channels such as RGB or CMY. The signal range for each channel is usually from 0 to 255. For a color printer, letting C=M=Y=0, 10, 20, . . . , 240, 255, we can produce an image 32 having 26 near-neutral patches $P_1, P_2, \ldots P_{26}$, as depicted in FIG. 3. Returning to FIG. 11, these near neutral patches $P_1, P_2, \ldots P_{26}$ are scanned on the scanner 10 to produce a plurality M of RGB values within each patch. The RGB values in each patch are averaged as follows:

$$R_{avg} = \frac{R_1 + R_2 + \ldots R_M}{M} ; \quad (1)$$

$$G_{avg} = \frac{G_1 + G_2 \ldots G_M}{M} ;$$

$$B_{avg} = \frac{B_1 + B_2 \ldots B_M}{M} ,$$

to produce average R, G, and B values for each patch (34). Next, the RGB values within each color patch are averaged as follows:

$$\frac{R_{avg} + G_{avg} + B_{avg}}{3} , \quad (2)$$

to produce 26 averaged scanner color signals (36). The 26 averaged scanner color signals are plotted against printer color signal values as shown in FIG. 4, and a curve is fit through the points (38). This curve may be piecewise linear, or any form of smooth curve such as a spline. Although this step is described as a graphical operation for ease of description, it is understood that the operation is performed digitally in the digital image processor 12.

Returning now to FIG. 10, the step (22) of generating a set of uniformly distributed color patches will be described. The curve through the 26 points shown in FIG. 4 gives a one-to-one corresponding relationship between equal printer code values and the average scanner code values. The range (Avgmin, Avgmax) is divided into N−1 intervals of equal length, the corresponding N CMY code values, denoted by $S_0, S_1, \ldots, S_{N-1}$, are determined from the graph. Based on the N values, we can produce N×N×N ($N^3$) color patches with code values:

$$(C_i, M_j, Y_k) = (S_i, S_j, S_k), i, j, k=0, 1, \ldots, N-1$$

Figure 5:
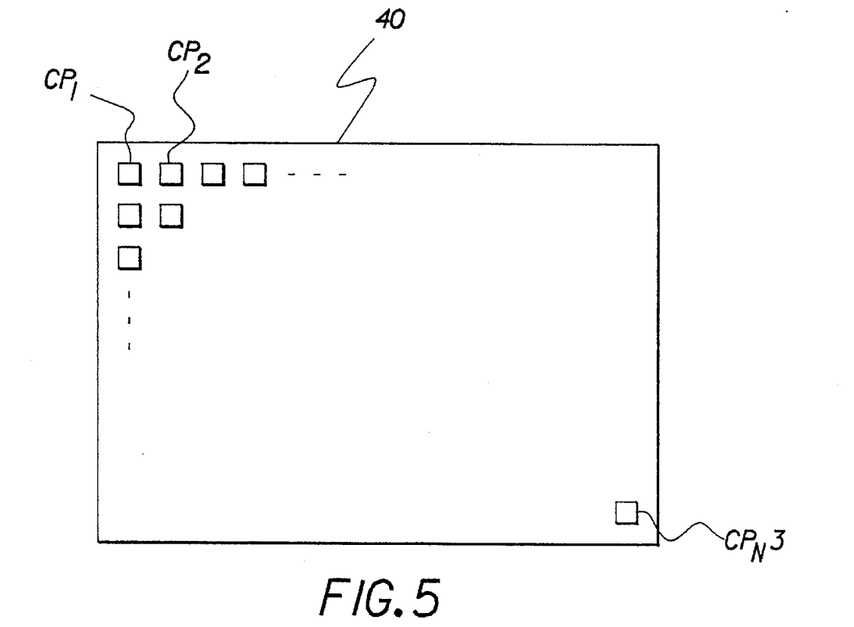
FIG. 5 is a diagram showing a set of color patches produced from a printer.

An image 40 containing the resulting $N^3$ color patches $CP_1, CP_2, \ldots CP_{N^3}$ is illustrated in FIG. 5. Selecting color patches in this way has the following advantages: (1) the $N^3$ color patches cover a full range of the output device gamut; (2) the code values of the color patches are lattice points in the output device signal space; (3) the scanned code values of these color patches are uniformly distributed in the input device signal space. Depending on applications, N can be a number between 5 to 11, and is preferably 9.

Figure 6:
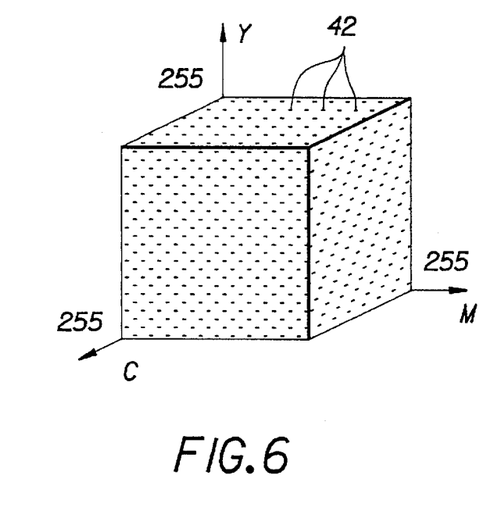
FIG. 6 is a plot showing points uniformly distributed in printer color signal space.
Figure 7:
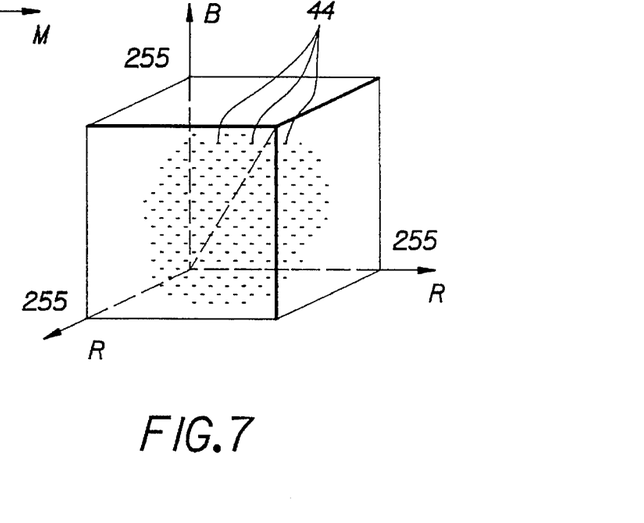
FIG. 7 is a plot showing points in scanner color signal space corresponding to the points in printer color signal space in FIG. 6.

Referring again to FIG. 10, the next step (24) is to create a 3D LUT from CMY to RGB based on the $N^3$ color patches. This can be done by scanning the $N^3$ color patches on the scanner to obtain $N^3$ RGB readings. Each of the RGB readings is formed by taking the average of a number of scanned pixels from each color patch. FIG. 6 plots the distribution of the $N^3$ printer color signals used to generate the color patches in the printer CMY space, and FIG. 7 plots the resulting $N^3$ RGB scanner color signals for the N3 color patches in the scanner RGB space. This data set forms a three-dimensional look-up table (3DLUT) from CMY to RGB in which the nodes 42 in CMY space are lattice points and the corresponding points 44 in RGB space are randomly distributed.

The optional next step (28) is to smooth the 3DLUT, i.e., to smooth the points in RGB space. This step is helpful if the scanned data in RGB contains significant noise. The problem of smoothing a 3DLUT can be decomposed into a number of problems of smoothing 1DLUTs as follows. Given 5 points $(x_{i-2}, y_{i-2}), (x_{i-1}, y_{i-1}), (x_i, y_i), (x_{i+1}, y_{i+1}), (x_{i+2}, y_{i+2})$, replace the original value $y_i$ by $w_0$, where:

$$(w_0, w_1, w_2, w_3) = (YT')(TT')^{-1}$$

$$T = \begin{bmatrix} 1 & 1 & 1 & 1 & 1 \\ t_{-2} & t_{-1} & t_0 & t_1 & t_2 \\ t_{-2}^2 & t_{-1}^2 & t_0^2 & t_1^2 & t_2^2 \\ t_{-2}^3 & t_{-1}^3 & t_0^3 & t_1^3 & t_2^3 \end{bmatrix}$$

$$t_j = x_{i+j} - x_i, j = -2, -1, 0, 1, 2$$

$$Y = (y_{i-2}, y_{i-1}, y_i, y_{i+1}, y_{i+2}).$$

Figure 8:
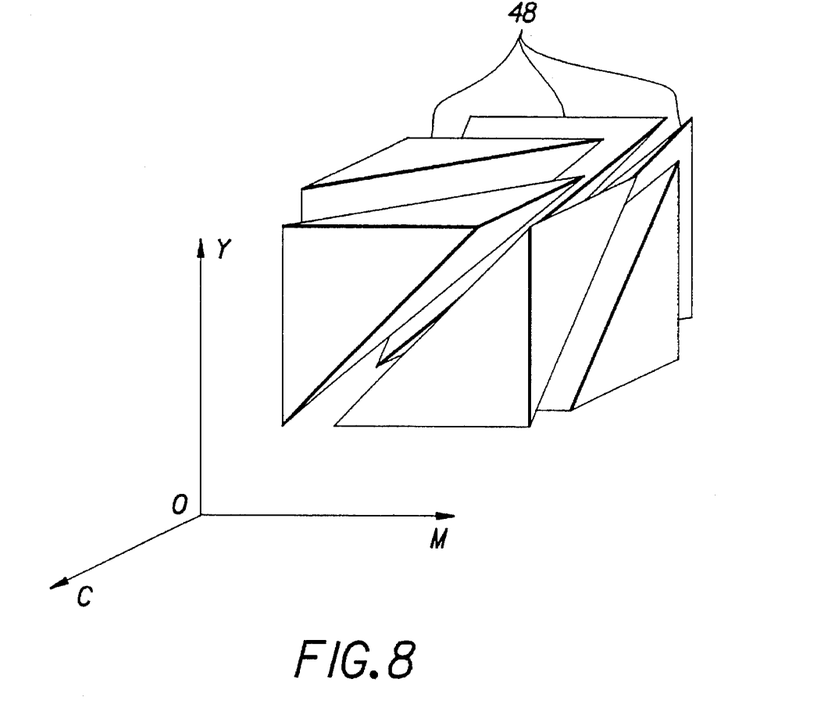
FIG. 8 is a diagram describing the step of partitioning the scanner color signal space into tetrahedra.
Figure 12:
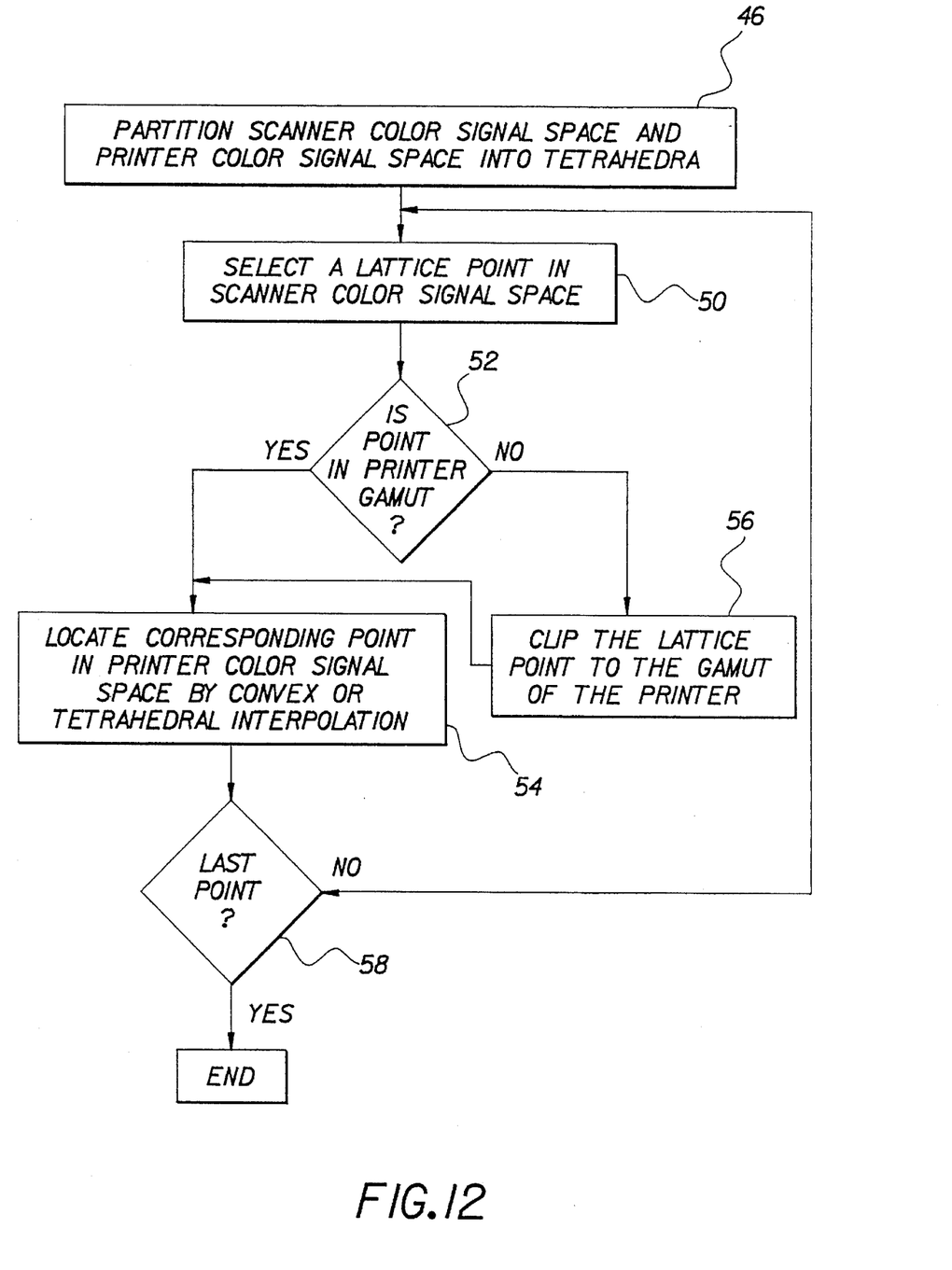
FIG. 12 is a flow chart illustrating the steps of inverting a lookup table to generate a calibration lookup table according to the present invention.

Next, the lookup table is inverted (26) to form the calibration lookup table. This is accomplished as shown in FIG. 12 by the following steps. First, partition the CMY and RGB spaces into tetrahedra (46) as follows. The $N^3$ points in CMY divide the CMY space into $(N-1)^3$ sub-cubes, and the $N^3$ points in the RGB space partition the RGB space into $(N-1)^3$ convex hulls. Each sub-cube in CMY and each convex hull in RGB has 8 vertices. Each sub-cube in CMY can be further split into 6 tetrahedra 48 as shown in FIG. 8. There are several ways to partition a cube into tetrahedra and any such partition is acceptable. Accordingly, each convex hull in RGB is partitioned into 6 corresponding tetrahedra (a tetrahedron is a special case of convex hull). In total, there are 6x$(N-1)^3$ tetrahedra in CMY space, and the same number of tetrahedra in RGB space. There is a one-to-one corresponding relationship between the tetrahedra in the two spaces. Each tetrahedron can be uniquely specified by 4 points.

Figure 9:
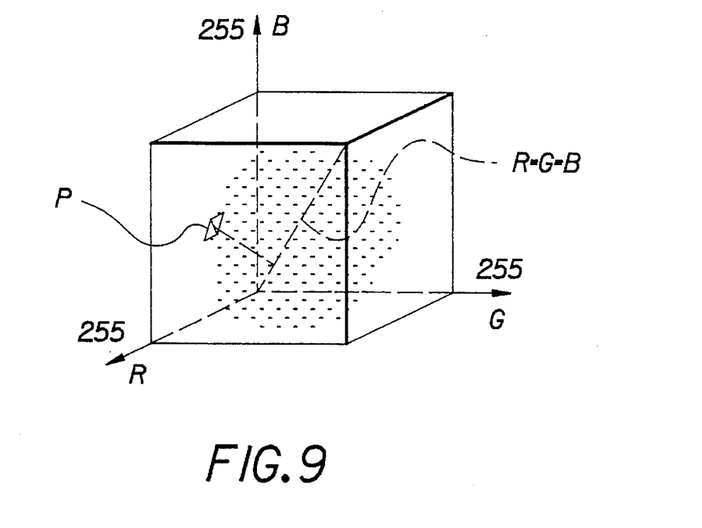
FIG. 9 is a diagram describing the step of clipping a lattice point in scanner color signal space to the printer gamut.

Finally, referring to FIG. 9, a calibration 3DLUT from RGB scanner signal space to CMY printer signal space is created in which the nodes in scanner RGB color signal space are lattice points. The calibration 3DLUT is created as follows. A lattice point p in the 3DLUT is selected (50) in RGB scanner color signal space, if p is enclosed in one of the $6 \times (N-1)^3$ tetrahedra in RGB, it means that the color p is inside the printer gamut (52), and can therefore be produced by the printer. The printer code value for this color is determined (54) by tetrahedral interpolation as described in the article "Colorimetric calibration in electronic imaging devices using a lookup table model and interpolation" by P. C. Hung, Journal of Electronic Imaging, 2(1), pp. 53–61, January 1993, which is incorporated herein by reference, or convex interpolation as described in U.S. patent application Ser. No. 08/068,823, entitled "Method and apparatus for convex interpolation for color calibration", filed May 28, 1993 by S. J. Wan, R. Miller, and J. Sullivan, which is incorporated herein by reference. If p is not contained by any tetrahedron in RGB, it means that the color p is out of the printer gamut, and cannot be produced by the printer. In this case, a clipping strategy is required to map the out-of-gamut color p into an in-gamut color (56). The preferred embodiment of this invention is to clip p perpendicularly toward the gray line R=G=B until it reaches the boundary of one tetrahedron as shown in FIG. 9. Then, locate its corresponding point in printer color space by the methods described above. Repeating this process (58) to each lattice point in the 3DLUT in RGB, we obtain a 3DLUT from RGB to CMY. Once this 3DLUT is obtained, color transform from RGB to CMY can be done by the conventional tri-linear interpolation.

The main computational cost in generating the 3DLUT from RGB to CMY is to determine if a given lattice point p in RGB is enclosed by a tetrahedron, and to clip an out-of-gamut point to an in-gamut point. The efficiency can be significantly improved by using the method described in U.S. patent application Ser. No. 08/068,887 entitled "Method and Apparatus for determining a gamut boundary and a gamut descriptor", filed May 28, 1993 by S. J. Wan, and U.S. patent application Ser. No. 08/068,941, filed May 28, 1993 by S. J. Wan, R. Miller, and J. Sullivan, which are incorporated herein by reference, and which disclose a technique of computing a gamut descriptor before creating a 3DLUT. To use this method, we need to introduce an orthogonal transform to RGB space so that the gray line R=G=B becomes an axis in the new coordinate system, say, lab. The orthogonal transform can be, for example, a rotation transform:

$$\begin{bmatrix} l \\ a \\ b \end{bmatrix} = \begin{bmatrix} 0.5772 & 0.5774 & 0.5772 \\ -0.4082 & 0.8164 & -0.4082 \\ -0.7070 & 0 & 0.7070 \end{bmatrix} \begin{bmatrix} R \\ G \\ B \end{bmatrix}.$$

The clipping method then consists of the following steps: (1) converting all the lattice points in the 3DLUT into the lab space using the orthogonal transform; (2) computing a gamut descriptor in lab; (3) creating a 3DLUT from lab to CMY; (4) replacing the entry node points in lab by their corresponding lattice points in RGB. This preferred clipping method uses a gamut descriptor to speed up the computations for determining if a given point is inside the printer gamut, and clipping an out-of-gamut point to an in-gamut point.

It is to be understood that all of the steps described above are performed automatically in the digital image processor, with the exception of manually transferring the printed test patches from the printer 14 to the scanner 10.

The invention has been described with reference to a preferred embodiment. However, it will be appreciated that variations and modifications can be effected by a person of ordinary skill in the art without departing from the scope of the invention.

PARTS LIST 10  color scanner
12  digital image processor
14  color printer
16  color transform f()
18  color transform g()
(20) determine relationship step
(22) generate color patches step
(24) produce LUT step
(26) invert LUT step
(28) smooth LUT step
(30) produce a set of near neutral patches step
32  image of neutral patches
(34) scan near neutral patches step
(36) average scanner color signal step
(38) fit curve to average scanner color signals step
40  image of color patches
42  points in CMY printer color signal space
44  corresponding points in RGB scanner color signal space
(46) partition color signal spaces into tetrahedra step
48  tetrahedra
(50) select lattice points in scanner color signal space step
(52) determine if lattice point is in printer gamut step
(54) locate corresponding point in printer color signal space step
(56) clip to printer gamut step
(58) complete for all points step

I claim:

1. A method of calibrating a digital color reproduction apparatus having a scanner for scanning a color image to produce scanner color signals representing said color image, a digital image processor for processing the scanner color signals to produce printer color signals, and a printer responsive to said printer color signals for printing a reproduced color image, the digital image processor including a calibration lookup table that maps the scanner color signals to the printer color signals when the original color image and the reproduced color image are on a same medium, comprising the steps of:

a) determining a relationship between equal printer color signals and averaged scanner color signals;

b) based on the determined relationship, generating a set of color patches on the printer that are uniformly distributed in scanner color signal space;

c) scanning the color patches to generate a lookup table relating printer color signals to scanner color signals; and d) inverting said lookup table to generate said calibration lookup table.

2. The method claimed in claim 1, wherein said step of determining the relationship between equal printer color signals and averaged scanner color signals, comprises the steps of:

a) producing a set of near neutral patches on the printer;

b) scanning the set of near neutral patches and averaging scanner color signals in each patch to produce averaged scanner color signals;

c) averaging the averaged scanner color signals from each patch to produce an averaged scanner color signal for each near neutral patch; and d) fitting a curve to the averaged color signals.

3. The method claimed in claim 1, wherein all of the possible colors that can be printed by the printer is called a printer gamut, and wherein said step of inverting said lookup table to generate said calibration lookup table, comprises the steps of:

a) partitioning the scanner and printer color signal spaces into tetrahedra;

b) for each lattice point in scanner color signal space, if the lattice point is in the printer gamut, locating a corresponding point in the printer color signal space by convex or tetrahedral interpolation, else clipping the lattice point to a point within the printer gamut, and locating a corresponding point in the printer color signal space.

4. The method claimed in claim 1, further comprising the step of smoothing the lookup table prior to inverting.

5. A digital color reproduction apparatus comprising:

a) a scanner for scanning a color image to produce scanner color signals representing said color image;

b) a digital image processor for processing the scanner color signals to produce printer color signals;

c) a printer responsive to said printer color signals for printing a reproduced color image; and d) said digital image processor including a calibration lookup table that maps the scanner color signals to the printer color signals when said color image and the reproduced color image are on a same medium, and means for automatically generating said calibration lookup table, including:

i) means for determining a relationship between equal printer color signals and averaged scanner color signals;

ii) means for generating a set of color patches on the printer that are uniformly distributed in scanner color signal space, based on the determined relationship;

iii) means for scanning the color patches to generate a lookup table relating printer color signals to scanner color signals; and iv) means for inverting said lookup table to generate said calibration lookup table.

* * * * *